(12) United States Patent
Wang

(10) Patent No.: US 7,397,809 B2
(45) Date of Patent: Jul. 8, 2008

(54) SCHEDULING METHODS FOR COMBINED UNICAST AND MULTICAST QUEUING

(75) Inventor: Linghsiao Wang, Irvine, CA (US)

(73) Assignee: Conexant Systems, Inc., Red Bank, NJ (US)

( * ) Notice: Subject to any disclaimer, the term of this patent is extended or adjusted under 35 U.S.C. 154(b) by 1179 days.

(21) Appl. No.: 10/319,304

(22) Filed: Dec. 13, 2002

(65) Prior Publication Data

US 2004/0114616 A1 Jun. 17, 2004

(51) Int. Cl.
*H04L 12/28* (2006.01)
*H04L 12/56* (2006.01)

(52) U.S. Cl. .................. 370/417; 370/390; 370/415

(58) Field of Classification Search ................ 370/216, 370/229, 230, 232, 235, 241, 242, 248, 312, 370/349, 351, 390, 410, 412–418, 429; 710/35
See application file for complete search history.

(56) References Cited

U.S. PATENT DOCUMENTS

| 5,129,070 | A  | * | 7/1992 | Dorotte ...................... 711/209 |
| 5,898,687 | A  | * | 4/1999 | Harriman et al. ............ 370/390 |
| 6,212,182 | B1 |   | 4/2001 | McKeown |
| 6,349,097 | B1 |   | 2/2002 | Smith |
| 6,601,116 | B1 | * | 7/2003 | Shemla et al. ................ 710/35 |
| 6,904,043 | B1 | * | 6/2005 | Merchant et al. ............ 370/402 |
| 6,941,392 | B2 | * | 9/2005 | Shemla et al. ................ 710/35 |
| 7,082,138 | B2 | * | 7/2006 | Yik et al. ..................... 370/410 |
| 2004/0008716 | A1 | * | 1/2004 | Stiliadis ....................... 370/429 |

\* cited by examiner

*Primary Examiner*—Ronald Abelson
(74) *Attorney, Agent, or Firm*—Thomas, Kayden, Horstemeyer & Risley LLP

(57) ABSTRACT

An improved combined Switching Data Unit (SDU) queuing discipline for unicast and multicast (Protocol Data Unit) PDU forwarding at a switching node is provided. Multicast SDU descriptors are replicated and stored in entries of a First-In/First-Out queue portion of a hybrid output port queue. Unicast SDU descriptors are chained in entries of a linked list queue portion of the hybrid output port queue. Servicing of the hybrid queue uses hybrid queue counters, and inter-departure-counters stored in multicast FIFO queue entries to keep track of the number of unicast SDU linked list entries, to be serviced between the multicast FIFO queue entries. The combined hybrid queue derives storage efficiency benefits from linking unicast PDUs in linked lists and further derives benefits from a simple access to multicast PDU entries.

12 Claims, 7 Drawing Sheets

SCHEDULING METHODS FOR COMBINED UNICAST AND MULTICAST QUEUING

FIELD OF THE INVENTION

The invention relates to packet-switching data transport technologies, and in particular to methods and apparatus for combined output port queuing of unicast and multicast traffic.

BACKGROUND OF THE INVENTION

Packet-switching technologies concern the transport of packetized data segments across an interlinked data transport infrastructure including transport nodes and interconnecting links. The term Protocol Data Unit (PDU) will be used throughout the description presented herein, persons of ordinary skill in the art would recognize that the term refers generally to: cells, frames, packets, etc. Once a PDU is received at a switching node, the PDU is inspected, information is extracted from the PDU, and for switch processing purposes the PDU is referred to as a Switching Data Unit (SDU) corresponding to the PDU.

FIG. 1 is a schematic diagram showing a generic implementation of a switching node. In general terms the operation of a switching node 100 includes: receiving a PDU from an input port 102, storing 104 the corresponding SDU while the SDU is pending processing, determining 106 an output port 110 to send the PDU through, and forwarding 108 the PDU via the determined output port 110. It is understood that the ports of the switching node 100 include bi-directional ports which correspond to pairs of input ports 102 and output ports 110.

Packet-switching technologies from their infancy have largely concentrated on non-deterministic transport of PDUs. Benefits provided by the non-deterministic mode of transport are derived from an ability of transport nodes in a communications network to route PDUs around failed infrastructure.

The non-deterministic mode of transport suffers from an inherent inability to guarantee conveyance of PDUs. PDUs may be dropped in accordance with various PDU transport protocol specifications and error/congestion conditions. The inability to guarantee PDU conveyance is referred to as "best-effort transport". Although packet-switched technologies, such as Asynchronous Transmission Mode (ATM) and MultiProtocol Label Switching (MPLS), providing support for deterministic PDU transport exist, best-effort non-deterministic packet-switched technologies enjoy the widest use.

There is an increasing demand for service level guarantees in provisioning services employing best-effort non-deterministic PDU transport technologies. One approach to provide service level guarantees, while still benefiting from non-deterministic PDU transport, is to ascribe traffic class associations to PDUs, and to preferentially process the corresponding SDUs, at network nodes in the transport path, based on the traffic class association. Only low priority SDUs and especially unclassified SDUs remain subject to best-effort processing and transport. Prioritizing SDU processing and transport intends to reduce denial of service instances to a minimum, and for this reason non-deterministic priority based SDU processing is preferred in certain applications.

In conveying "unicast" PDU traffic, each PDU traffic stream is generated by a source network node on edge and consumed by a sink network node on edge. "Multicast" traffic is generated by a single source network node on edge, replicated by an undetermined number of transport nodes in the interconnecting network, and aggregate traffic is consumed by multiple sink network nodes on edge. Therefore there is an unbound ability for the network to create traffic during a normal course of operation. Traffic creation in the network has numerous implications which are subject to intense current research and development some of which are addressed herein below.

Other service provisioning issues affecting resource utilization in the network relate to traffic patterns. Data traffic is not evenly distributed over the links and therefore processing requirements at network nodes differ. Data traffic created by source network nodes is in itself dynamic, unpredictable, and often bursty. Overall data traffic patterns vary from network to network and may even vary with time.

Further, electronic data services are typically provisioned from server network nodes to which a large amount of service request PDUs are directed, and from which a large amount of response PDUs are supplied.

In view of the above mentioned issues, the practical operation of a typical switching node must make provisions for queuing SDUs and adhere to queue service disciplines. Methods and apparatus for queuing SDUs pending processing, as well as methods of servicing queues continue to represent areas of intense research.

From the point of view of a particular switching node 100, the switching node 100 has multiple physical ports 102/110 via which PDUs are exchanged with the network. As the SDU traffic is conveyed through the switching node 100 in a non-deterministic fashion, multiple SDUs from a variety of input ports 102 may happen to be destined for to the same output port 110 within a short period of time, such is the case if the output port 110 is associated with a server node. Assuming equal port transport capacities and PDUs incoming at high rates close to the full link transport bandwidth, a number of SDUs have to be held in an output port queue 112 for forwarding via the output port 110. SDUs stored in the output port queue 112 incur a processing latency and depart from the queue 112 when the output port 110 is ready to transmit.

Should a multicast PDU be received at the switching node 100, the replication of the corresponding SDU and the individual forwarding of each replica is yet another factor which may also delay the processing of other SDUs. The processing of SDUs is therefore affected by queuing methods and queue service disciplines employed.

A prior art U.S. Pat. No. 6,212,182 entitled "Combined Unicast and Multicast Scheduling" which issued on Apr. 3, 2001, to McKeown describes a complex queuing method for preprocessing received ATM cells. For all cells received via an input port, unicast cells are queued in a group of unicast output port queues associated with the input port, and multicast cells are queued in a multicast queue associated with the input port. The intended ATM application benefits from this complex cell separation. Further McKeown describes an improved request-based scheduling of the separated unicast/multicast cell traffic to effect cell transfer across a switching fabric. Although inventive, the described methods assume reliance on prior reservation of transport and processing bandwidth enforceable in using ATM technologies, addresses global queuing issues only and does not address issues related to output queuing requirements which do not seem to represent a concern.

Processing queues may be implemented in a variety of ways between which, the use of physical First-In/First-Out queues (FIFOs) and link list queuing have enjoyed extensive research and implementation.

A prior art U.S. Pat. No. 6,349,097 entitled "Multicasting in Switching Apparatus" which issued Feb. 19, 2002 to Smith makes use of global FIFO queues to store unicast and multicast ATM cells so that the received sequence of the cell stream can be retained. The solution is concerned with solving quality-of-service issues related to cell sequencing. Smith also does not address output port queuing resource utilization issues.

Physical handling of received SDUs by transferring them between input ports 102, various buffers 120, various queues 112, output port(s) 110, etc. has drawbacks related to the fact that read and write operations are time consuming. Except for ATM cell processing, where cells have a fixed size, it is hard to contain the amount of time spent on physical SDU transfers within a switching node 110.

As the SDUs have to be stored at switching nodes 100 pending processing, it is best if the physical handling of each SDU was reduced preferably to one write operation when received, and preferably to at least one read operation when the destination port(s) 110 is/are ready to transmit the PDU out. For these and other reasons using centralized SDU storage 120 is preferred.

At all other times, structures called "descriptors", comparatively smaller than SDUs, are used to track SDU attributes. These attributes may include diverse information used to determine an output port 110 to send the SDU through and information to prioritize the forwarding of the SDU.

In view of the above, methods of queuing SDUs become in effect methods of queuing SDU descriptors. SDU descriptors may therefore be physically stored in physical FIFO queues 112. Descriptor FIFO queuing implementations are comparatively simple and more adapted to hardware implementation. Multicast SDUs are simply handled by replicating the multicast SDU descriptor and the resulting multiple descriptors are stored in corresponding output queues 112 associated with corresponding destination ports 110.

Although SDU descriptors are small compared with corresponding SDU sizes, requirements for high integration, high port density per switch, and high throughput capacity, lead to a need to address issues related to SDU descriptor storage in FIFO queues 112. The processing of multicast SDUs compounds the descriptor storage problem.

Consider the above mentioned scenario in which, a switching node 100, implementing SDU descriptor FIFO output port queuing, provides interconnectivity in a client-server networking environment. Assuming same capacity ports 102/110, the output port 110 associated with the server node, will typically experience congestion as the aggregate traffic from all other input ports 102 is directed to the server node.

Worse case scenario switching node design calls for the descriptor FIFO queue 112 associated with the server port 110 to be large (long) enough to accommodate SDU descriptors associated with an expected number of SDUs during a typical burst of server requests. Without knowing which output port 110 will be associated with the server during the manufacturing of the switching node 100, all output ports 110 need be provided with enough storage resources (112) in accordance with the worse case scenario. As port (102/110) density per switching node 100 increases, the storage reservation requirements for descriptor FIFO queues 112 increases also. If provisions for prioritization of SDU processing are to be made, the aggregate descriptor storage reservation requirements need be multiplied by the number of priority levels supported per port.

Size limitations on FIFO queue implementations exist because exclusive FIFO queue reservations are necessary. The total number of reserved FIFO queue descriptor entry "slots" is usually several times the maximum number of SDUs that can be processed at a switching node. In accordance with a typical implementation, suppose that the switching node having a typical number of 16 ports 102/110 has a combined storage capacity to buffer 1000 PDUs. With a single output port queue 112 per output port 110, typically 500 SDU descriptor slots are reserved for each FIFO queue 112. Therefore a total amount of storage for 8000 descriptor entries must be provided.

Complex switching node implementations accommodating a large number of SDUs in a central storage and/or implementing sophisticated transmit prioritization schemes use linked list queuing in an attempt to alleviate descriptor storage issues.

Link list queue implementations include interlinking SDU descriptors stored centrally in shared storage, via SDU descriptor pointers, in link lists defining virtual queues. Storage efficiency is enjoyed in making use of shared storage to hold SDU descriptors. Each SDU descriptor contains at least one next SDU descriptor pointer. SDU descriptor pointers require even less storage space than SDU descriptors.

Considering the above mentioned exemplary setup implementing a linked list queuing in a unicast only environment, for 1000 unicast PDUs buffered at the switching node, storage for only 1000 descriptor entries needs to be provided as which is significantly less than 8000. Each of the 1000 descriptors used in linked list queuing have only marginally larger storage requirements to account for the additional descriptor pointer storage. For each of the 16 output ports 110 only a single pointer register is needed to hold the head of line pointer specification for each linked list queue 112.

Although storage resource utilization reductions are achieved by using linked list queuing implementations for unicast traffic, the use of linked lists for queue implementations is cumbersome in handling multicast SDU queuing. FIG. 2 is exemplary of a typical association between unicast and multicast SDUs pending forwarding via a group of ports. Multicast SDUs cause a multiple-to-one and/or a one-to-multiple fan-out across multiple queues 112. As shown, each multicast SDU may have a different fan-out diversity across the port queues which makes for a complex combined association structure.

An implementation attempting to address this association complexity is illustrated in FIG. 3 which shows a global linked structure for unicast and multicast SDU queuing at a multi-port switching node. The implementation calls for the use of multiple SDU pointer fields associated with each multicast SDU linked list entry.

Each multicast SDU entry has a number of pointer fields equal to the maximum possible fan-out (the total number of ports of the switching node minus one—the port on which the corresponding multicast PDU was received). In accordance with a worst case scenario, for each multicast SDU, N-1 linking operations need to be performed within one SDU processing time interval. Such a task would be hard to achieve for high port density implementations. The processing of multicast SDUs further negatively impacts the operation of a switching node because the processing of multicast SDUs is memory access intensive. With a limited memory access bandwidth, uncontrolled processing multicast SDUs is detrimental to unicast SDU processing.

In provisioning support for Virtual Local Area Network (VLAN) or any other multicast domain control provisioning, multicast SDUs have a very diverse output port fan-out, the number of output ports being substantially less than the total number of ports per switching node. The high likelihood of the diversity of the fan-out being substantially less than the total number of ports, enables implementation of high port density designs. The discrepancy between a large number of ports per switching node and the median fan-out diversity leads to a lot of the descriptor pointer fields associated with multicast SDU entries to remain unused (filled with NULL pointers). At high multicast SDU throughput, unused descriptor pointer fields can take up a lot of storage resources and a lot of processing overhead is incurred in scheduling SDU processing based on the complex associativity structure. This represents a major disadvantage in using linked list implementations to queue multicast SDUs leading to a storage space utilization inefficiency wasting SDU processing resources and bandwidth.

There therefore is a need to solve the above mentioned issues in providing queuing methods and queue service disciplines for combined unicast and multicast SDU traffic processed at a switching node.

SUMMARY OF THE INVENTION

In accordance with an aspect of the invention, hybrid unicast and multicast queue for an output port is provided. The hybrid queue includes a unicast linked list queue portion, a multicast FIFO queue portion, and a sequencer. The operation of the sequencer includes inspecting a unicast PDU forwarding request arrival counter, a PDU departure counter, a multicast FIFO state, and a unicast linked list queue status to decide whether to forward a unicast or a multicast PDU over the output port. Each multicast FIFO entry also carries an inter-departure-counter value specifying the number of unicast linked list entries that have to be serviced before servicing the multicast FIFO entry.

A combined benefit is derived from unicast SDU descriptor linking to provide flexibility on the size of the hybrid queue, and efficiency in reserving storage resources by employing multicast FIFO queuing.

BRIEF DESCRIPTION OF THE DRAWINGS

The features and advantages of the invention will become more apparent from the following detailed description of the preferred embodiment(s) with reference to the attached diagrams wherein.

It will be noted that in the attached diagrams like features bear similar labels.

DETAILED DESCRIPTION OF THE EMBODIMENTS

Figure 1:
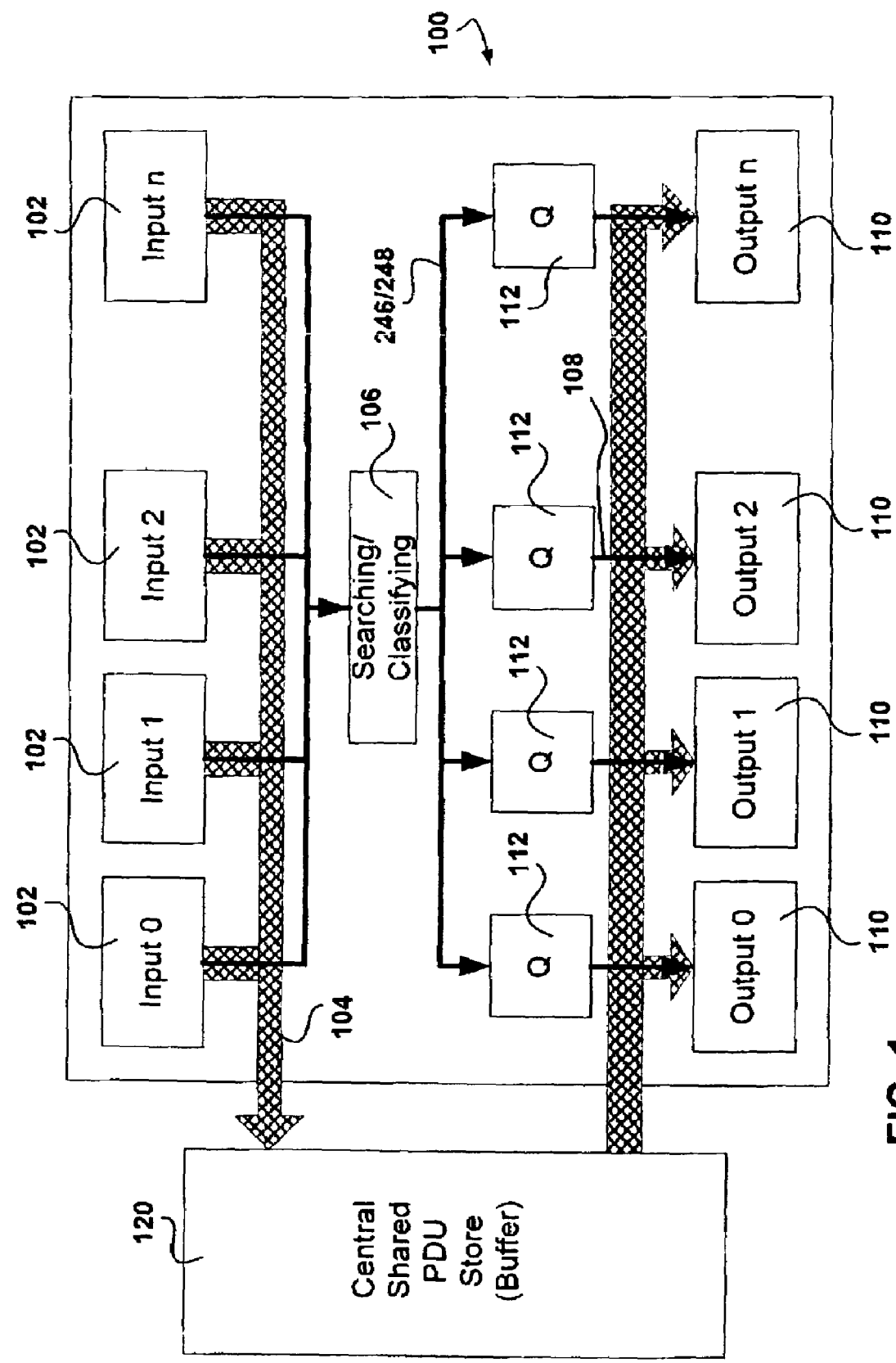
FIG. 1 is a schematic diagram showing a generic switching node implementation.
Figure 2:
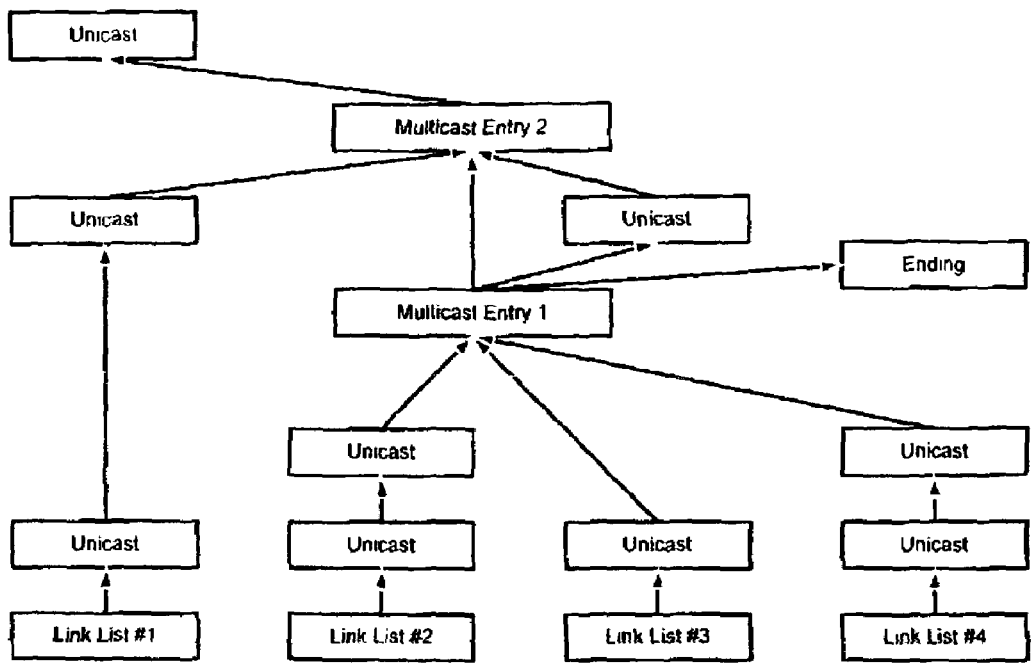
FIG. 2 is a schematic diagram showing an exemplary unicast and multicast associations between SDUs pending forwarding.
Figure 3:
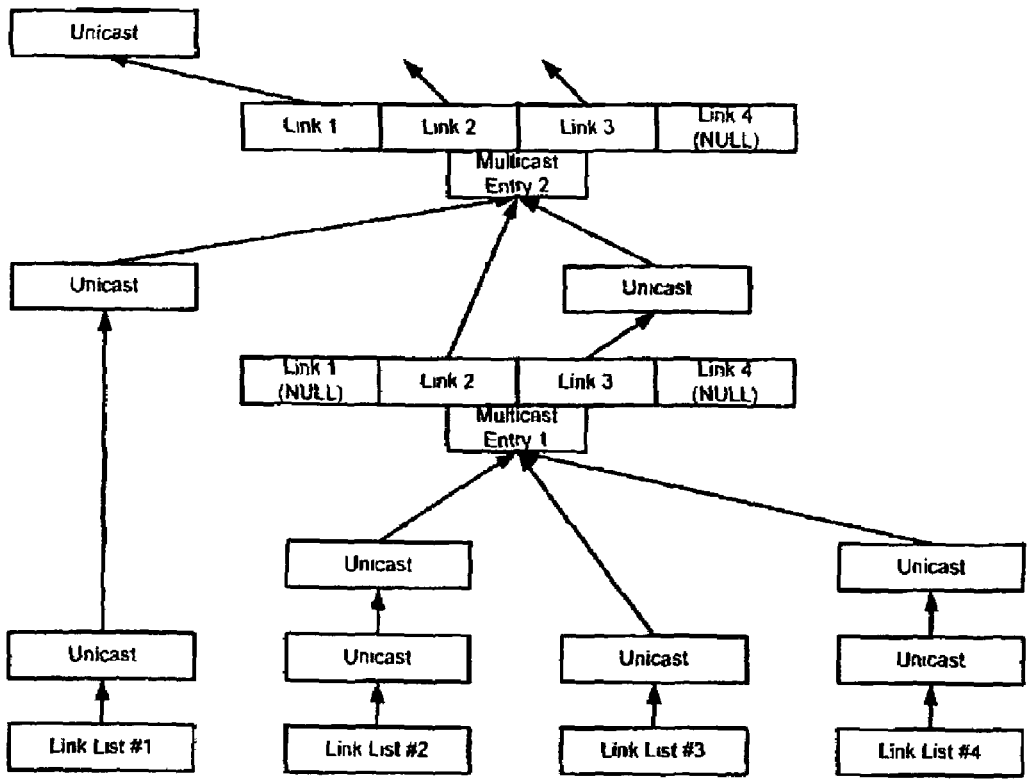
FIG. 3 is a schematic diagram showing a prior art unicast and multicast multi-port link list queuing implementation.
Figure 4:
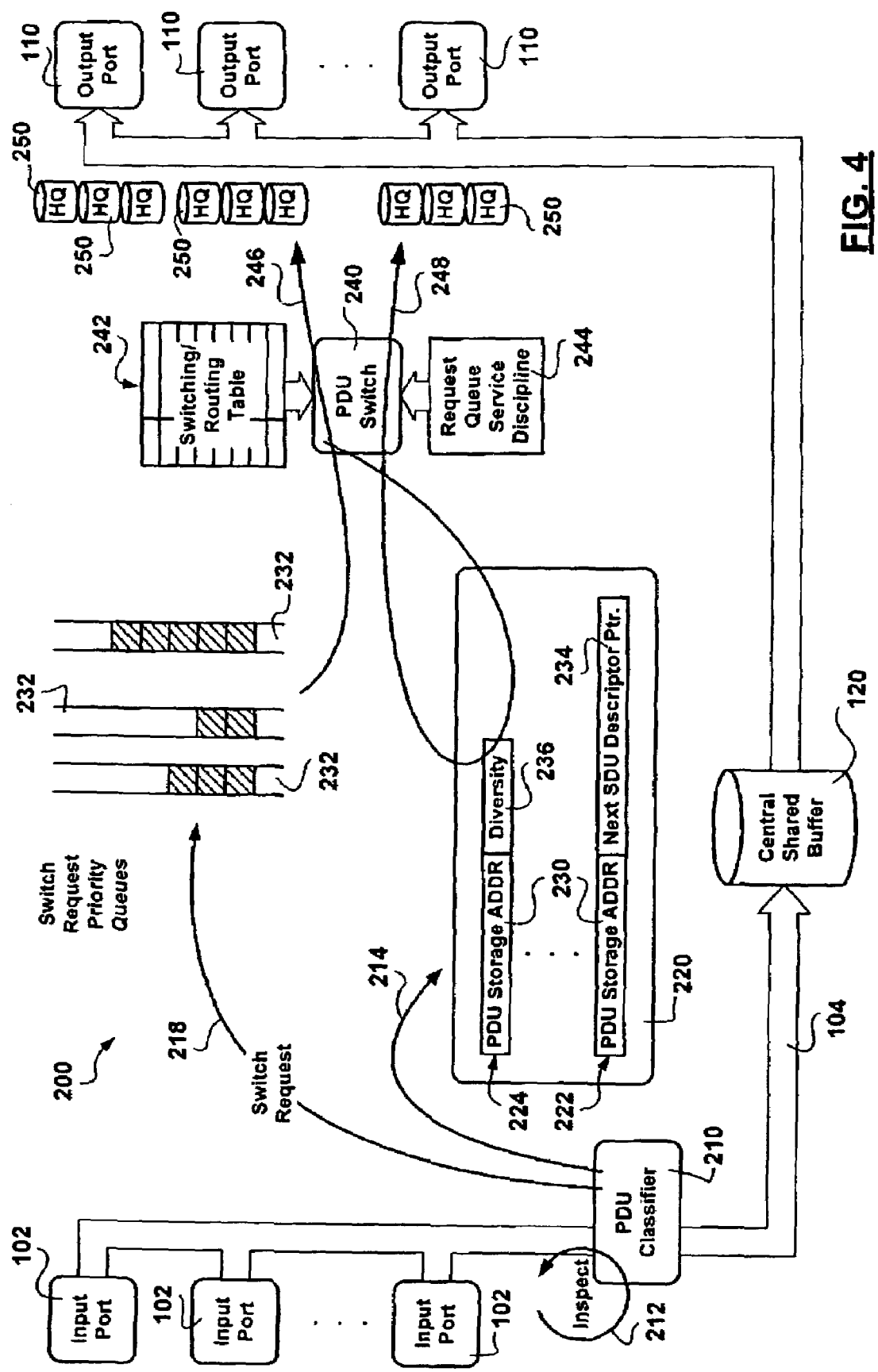
FIG. 4 is a schematic diagram showing an exemplary combined unicast and multicast SDU processing at a switching node.

Referring to FIG. 4, a schematic diagram showing an exemplary combined unicast and multicast SDU processing at a switching node is shown. PDUs received via an input port 102 are inspected by a PDU classifier 210 and are retrievably stored 104 in a central store 120. The PDU classifier 210 generates 212 an SDU descriptor for each received PDU, and stores 214 the SDU descriptor in a central descriptor storage 220. The SDU descriptors are stored in unicast descriptor entries 222 and multicast descriptor entries 224.

Unicast descriptor entries 222 specify, without limiting the invention, at least: a unicast PDU storage address pointing to a memory storage location in the central shared buffer 120, and a next descriptor pointer 234. Upon creating each unicast descriptor entry 222, the value of the next descriptor pointer 234 is set to NULL.

Multicast descriptor entries 224 specify, without limiting the invention, at least: a multicast PDU storage address pointing to a memory storage location in the central shared buffer 120, and a fan-out diversity value 236. Upon creating each multicast descriptor entry 224, the fan-out diversity value 236 is set to zero.

Each descriptor entry in the central descriptor storage 220 may include, without limiting the invention, a descriptor entry type specifier identifying the descriptor entity as a unicast or a multicast descriptor entity. Alternatively, the central descriptor storage 220 may be partitioned into unicast descriptor storage and multicast descriptor storage.

For each unicast PDU received, a destination network address 230 to forward the unicast PDU to, and a priority class association; and for each multicast PDU received, a group of destination network addresses 232 to forward the multicast PDU to, and a priority class association are extracted by the PDU classifier 210. Destination network address information and priority class associations are used by the PDU classifier 210 to formulate a switch request 218 for each inspected PDU. The switch request 218 is sent to the switch processor 240 along with an SDU descriptor pointer pointing to the corresponding SDU descriptor entry 222/224. Depending on the implementation, the switch requests 218 may be queued for processing by the switch processor 240; the queuing of switch requests 218 may employ multiple priority queues 232 corresponding to PDU priority class associations, and is beyond the scope of the present invention.

A switching processor 240 processes switch requests 218 to determine output ports 110 to forward the corresponding SDUs to. In performing the switching function, the switching processor 240 makes use of a switching database 242. The operation of the switching processor 240 may be subject to a service discipline 244 enabling priority based processing of PDUs.

In servicing a unicast SDU switching request 218, the switching processor 240 makes use of the single destination network address to determine a single output port 110 to forward the corresponding PDU therethrough. Once the destination output port 110 is determined, the switching processor 240 makes use of the priority class association to forward the SDU to an output port hybrid priority queue 250 associated with the determined output port 110. The output port hybrid priority queue 250 is provided with the corresponding SDU descriptor pointer in a forwarding request 246.

In servicing a multicast SDU switching request 218, the switching processor 240 makes use of the group of destination network addresses to determine a corresponding group of output ports 110 to forward the corresponding PDU therethrough. Once the group of output ports 110 is determined, the number of unique output ports 110 determined is stored in the fan-out diversity field 236. The switching processor 240 makes use of the priority class association to queue SDU descriptor replicas in output port hybrid priority queues 250 corresponding to the determined group of unique output ports 110. Each destination output port hybrid priority queue 250 is provided with an SDU descriptor pointer replica via a forwarding request 248.

Figure 5:
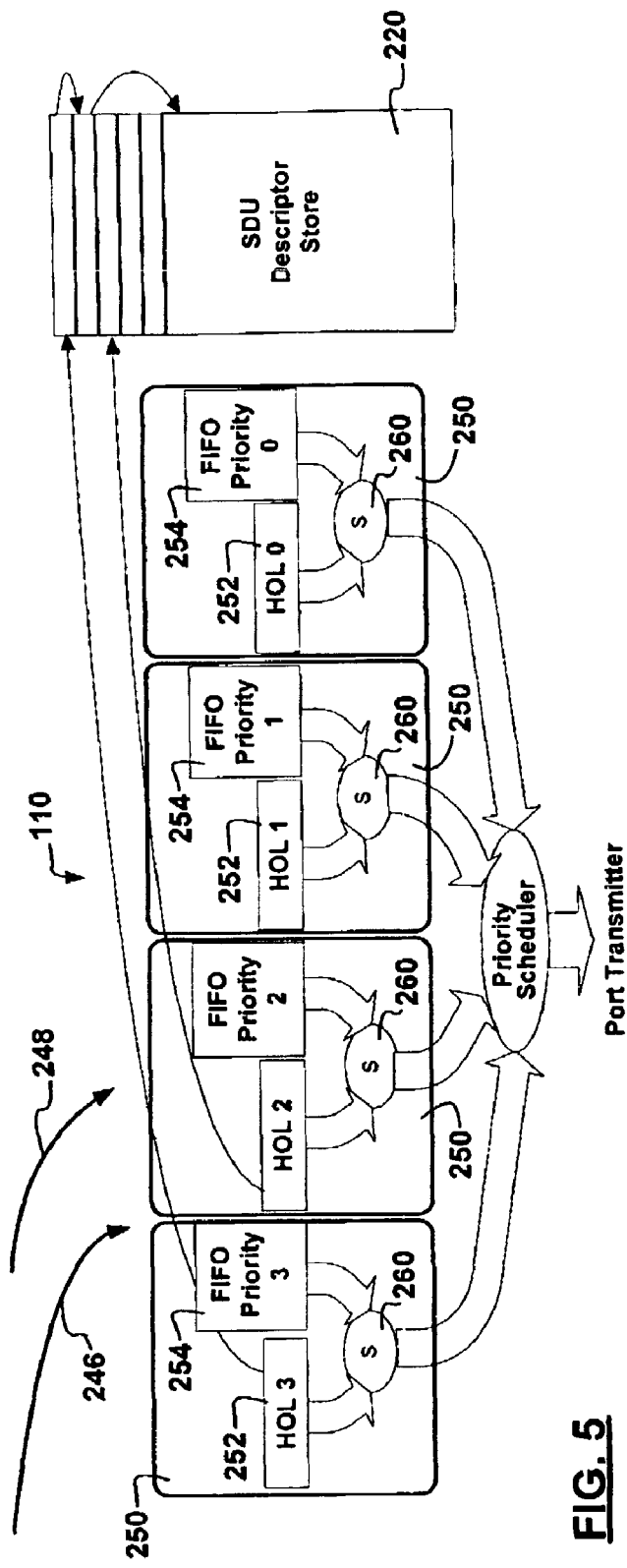
FIG. 5 is a schematic diagram showing an exemplary implementation of combined priority unicast and multicast queuing for an output port, in accordance with an exemplary embodiment of the invention.

In accordance with an exemplary embodiment of the invention, a hybrid output queue implementation used for queuing unicast and multicast SDU pointers at an output port 110 is shown schematically in FIG. 5. In particular, for each hybrid priority output queue 250 associated with the output port 110, the queuing of unicast SDU pointers makes use of link list queuing, and queuing of multicast SDU pointers makes use of FIFO queuing. A sequencer 260 is used in servicing a corresponding the hybrid priority queue 250.

In servicing each hybrid queue 250, the sequencer 260 must know when to pop multicast SDU FIFO entries and when to follow SDU descriptor pointer links. Each hybrid priority queue 250 maintains a Head-Of-Line (HOIL) pointer specifier 252 for the linked list of unicast SDU entries, and the hybrid priority queue 250 reserves memory storage for a FIFO queue 254. In accordance with an exemplary implementation of the invention, memory storage space for the FIFO queue 254 can be reserved from a memory block associated with the output port 110. In accordance with another implementation of the invention, memory storage space for the FIFO queue 254 is reserved from the central shared buffer 120. In using the central shared buffer 120, some level of caching may be employed to improve central shared buffer 120 access latency and efficiency.

Figure 6:
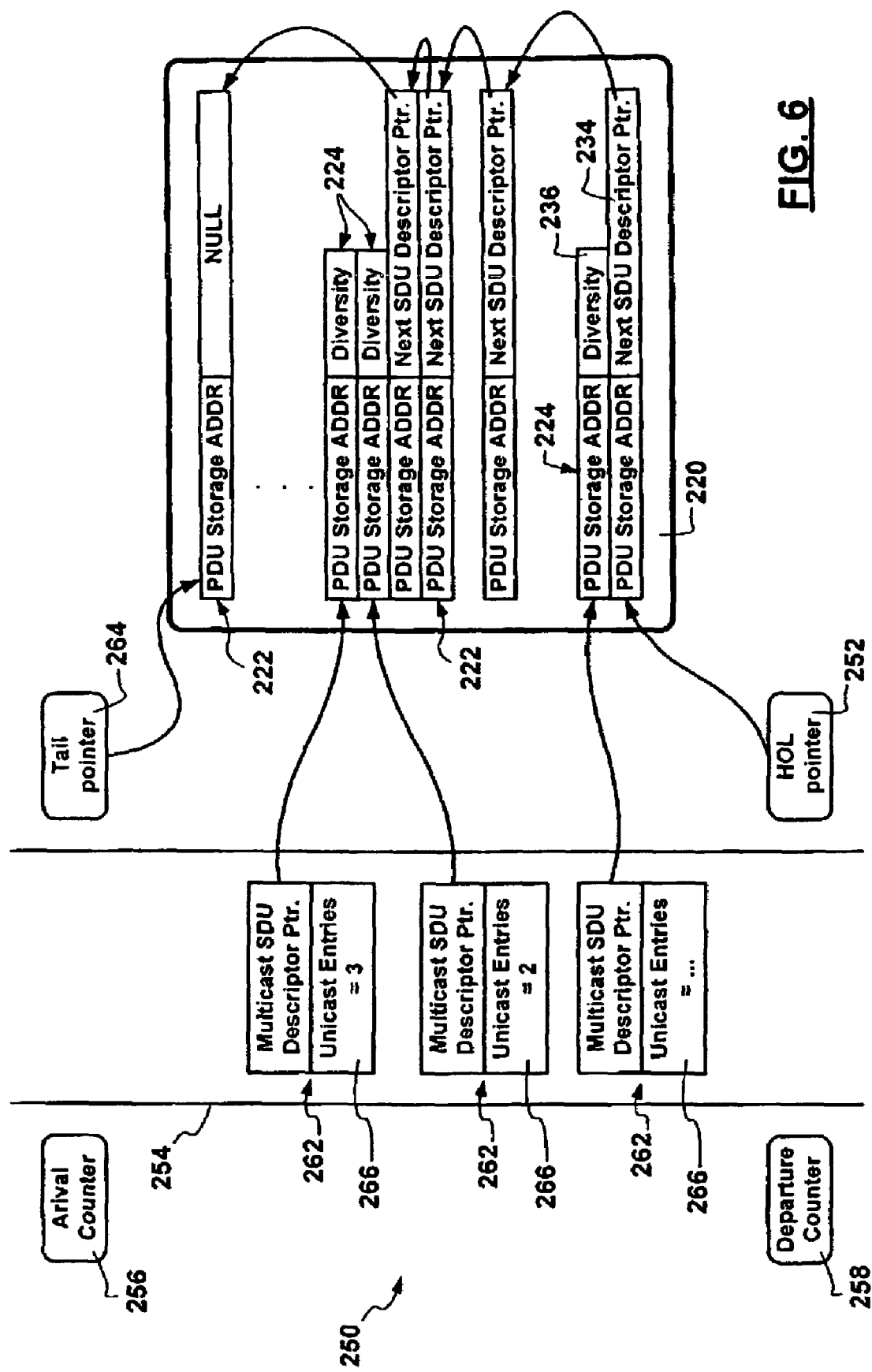
FIG. 6 is a schematic diagram showing details of a single hybrid queue implementation, in accordance with the exemplary embodiment of the invention.

FIG. 6 shows further details of an output hybrid queue 250 of an output port 110.

Unicast SDU descriptors 222 are chained via the next SDU descriptor pointer field 234. Each multicast SDU descriptor pointer replica will be written to a FIFO queue entry 262 along with extra information enabling the associated sequencer 260 to select between unicast and multicast queue entries to service next.

Figure 7:
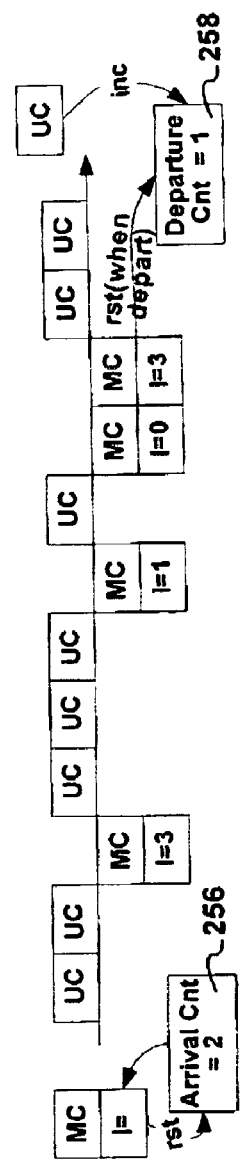
FIG. 7 is a schematic diagram showing a sequence of queued unicast and multicast SDU entries being serviced, in accordance with exemplary embodiment of the invention.

In accordance with the exemplary embodiment of the invention, FIG. 7 illustrates hybrid queue servicing details. The time line shows a sequence of unicast and multicast PDU forwarding request 246/248 arrivals and the sequence these are expected to depart via the output port 110.

Figure 8:
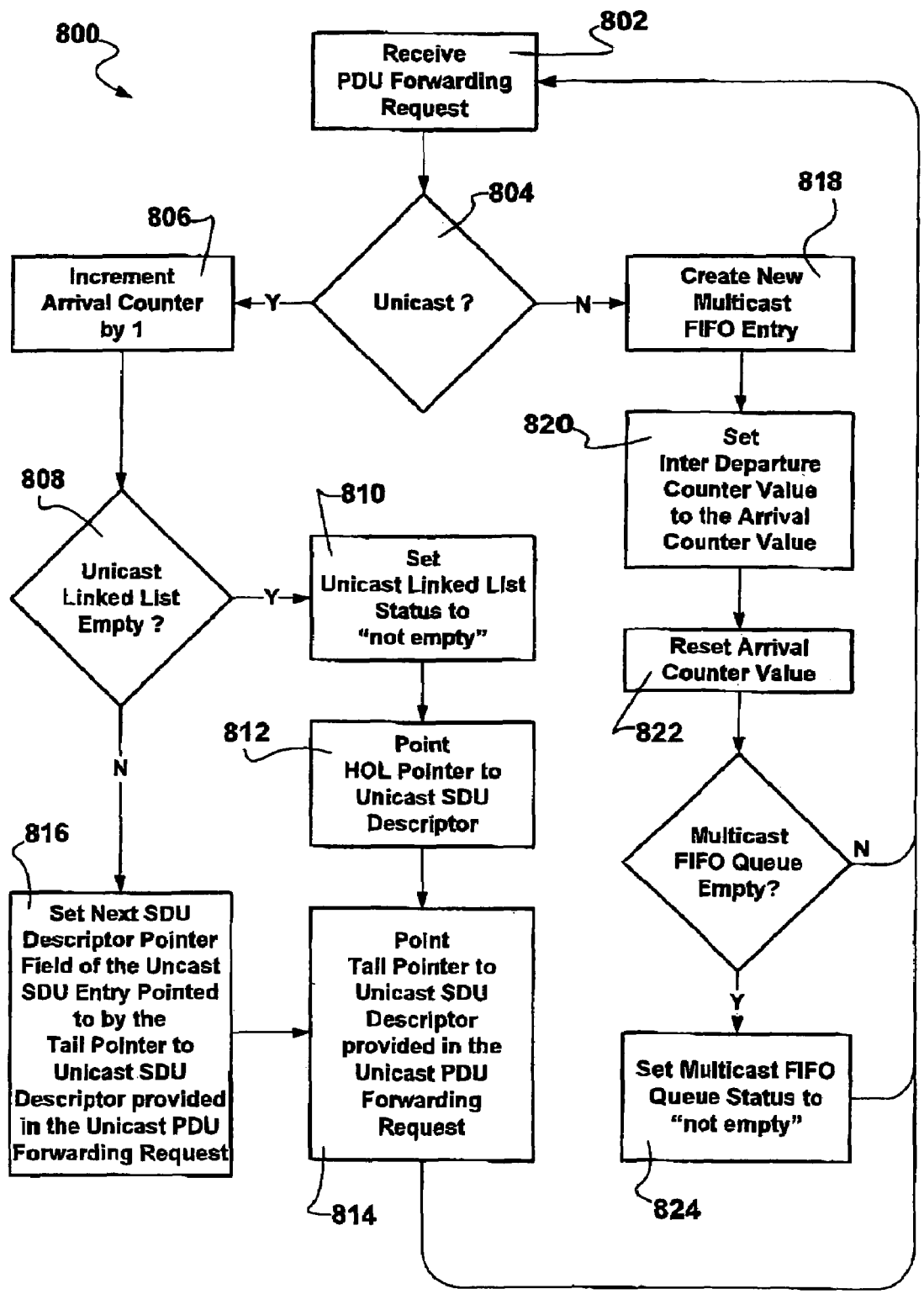
FIG. 8 is a flow diagram showing process steps implementing combined unicast and multicast queuing of PDU forwarding requests, in accordance with the exemplary embodiment of the invention.
Figure 9:
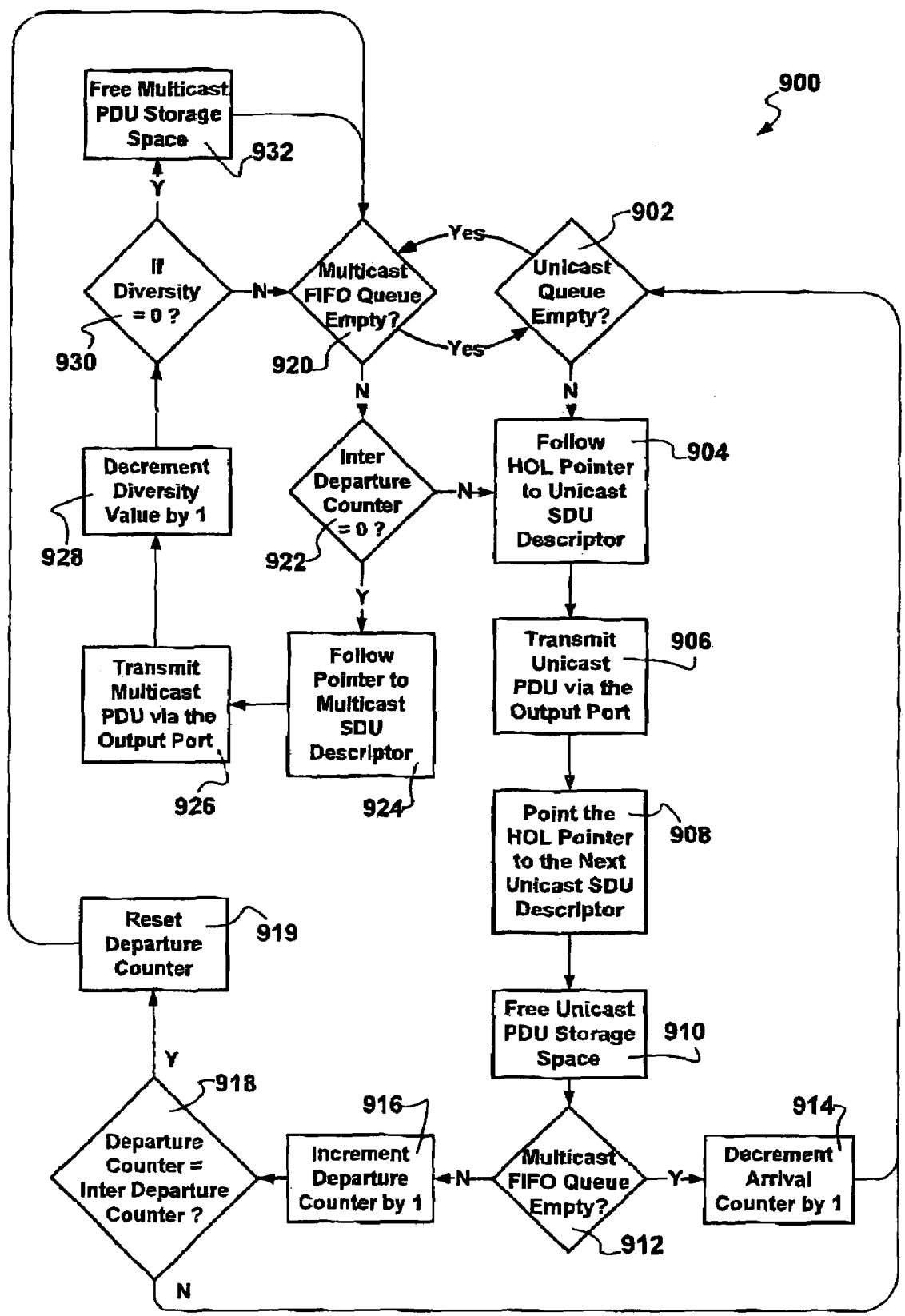
FIG. 9 is a flow diagram showing process steps implementing combined unicast and multicast queue servicing, in accordance with the exemplary embodiment of the invention.

FIG. 8 is an exemplary flow diagram showing combined unicast and multicast queuing of PDU forwarding requests, in accordance with the exemplary embodiment of the invention. FIG. 9 is an exemplary flow diagram showing combined unicast and multicast queue servicing, in accordance with the exemplary embodiment of the invention.

Suppose the hybrid queue 250 is empty. The unicast arrival counter 256 holds a value of 0 (zero). The departure counter 258 holds a value of 0 (zero). The HOL pointer specifier 252 points to NULL. The tail pointer specifier 264 also points to NULL. The multicast FIFO queue 254 does not have any entries. The multicast FIFO queue status is "empty" and the unicast linked list status is "empty".

Upon receiving 802 a unicast PDU (804) forwarding request 246, the unicast arrival counter 256 will be incremented 806 by 1. The unicast linked list status is set 810 to "not empty". The HOL pointer specifier value is set 812 to the corresponding unicast SDU descriptor pointer value provided in the unicast PDU forwarding request 246. Because there are no other unicast SDU entries in the unicast linked list, the tail pointer specifier 264 is also set 814 to point to the same unicast SDU descriptor pointer value.

If no subsequent unicast (804) PDU forwarding request 246 arrives 802 before the first unicast SDU entry is serviced, subsequent to servicing 906 of the unicast SDU entry, because the multicast FIFO queue 254 is empty 912 the arrival counter 256 is decreased 914 by 1. The sequencer 260 determines 902 whether the HOL pointer specifier 252 and the tail pointer specifier 264 hold the same pointer value. If the HOL pointer specifier 252 and the tail pointer specifier 264 hold the same value, then there are no other unicast SDU entries in the unicast linked list and both pointer specifiers 252 and 264 are set to NULL. The sequencer 260 removes 908 the unicast SDU entry from the unicast linked list. The unicast linked list queue status is set to "empty". The sequencer 260 frees 910 the storage space held by the corresponding PDU.

If a subsequent unicast (804) PDU forwarding request 246 arrives 802 before the first unicast SDU entry is serviced 906, the unicast arrival counter 256 will be incremented 806 by 1. Because the unicast linked list queue status is "not empty" 808, the tail pointer specifier 264 is used (816) to access (816) the unicast SDU descriptor 222 corresponding to the last queued unicast SDU entry, and store 816 the pointer value to the unicast SDU descriptor 222, provided in the just received unicast PDU forwarding request 246, in the next SDU descriptor pointer field 234 of the last queued unicast SDU entry. The tail pointer specifier 264 is then set to point 814 to the subsequent unicast SDU descriptor 222.

As previously mentioned if the first queued unicast SDU entry is serviced 906, because the multicast FIFO queue 254 is empty 912 the arrival counter 256 is decreased 914 by 1. The output port 110 sets 908 the HOL pointer specifier 252 to the next unicast SDU descriptor pointer value held in the next SDU descriptor field 234 of the serviced SDU descriptor 222. This results in the HOL pointer pointing to the subsequent SDU.

If a multicast (804) PDU forwarding request 248 is received 802 the multicast PDU descriptor pointer provided is stored in a newly created 818 multicast FIFO queue entry 262. The multicast FIFO queue status is set 824 to "not empty". Each multicast FIFO queue entry 262 also has an inter-departure-counter specifier 266. The value of the arrival counter 256 is stored 820 in the inter-departure-counter specifier 266 and then the arrival counter 256 is reset 822 to 0 (zero). This has the effect of tracking the number of unicast SDU entries which have to be serviced before the multicast SDU entry.

As the multicast FIFO queue status is "not empty", in servicing 906 a unicast SDU entry, the departure counter is increased 916 by 1. With the unicast linked list queue status "not empty", the sequencer 260 continues to service unicast SDU entries by following unicast SDU descriptor pointer links (234) until the value of the departure counter 258 equals 918 the value of the inter-departure-counter specifier 266 of the next multicast SDU entry 262. When the value of the departure counter 258 is equal 918 to the value of the next inter-departure-counter 266, the sequencer 260 resets 919 the value of the departure counter 258 to 0 (zero) and services 926 the next multicast FIFO entry 262.

In servicing 926 each multicast FIFO entry 262, the sequencer 260 makes use 924 of the multicast SDU descriptor pointer stored in the multicast FIFO entry 262 to access (924) the corresponding multicast SDU descriptor 224. Once a copy of the corresponding PDU is transmitted 926, the value of the diversity specifier 236 is decreased 928 by 1. If the value of the diversity specifier 236 is 0 (zero) in step 930, then the storage space held in the central shared buffer 120 is freed 932.

After servicing each multicast FIFO entry 262, the sequencer 260 pops (932) the multicast FIFO entry 262 and attempts to service the next multicast FIFO entry 262 if the multicast FIFO queue status is 920 "not empty". If the inter-departure-counter 266 of the next multicast FIFO entry 262 is 0 (zero) in step 922, then the sequencer 260 services 926 the multicast FIFO entry 262. If the inter-departure-counter 266 of the multicast FIFO entry 262 is not 0 (zero), then the sequencer 260 inspects 904 the HOL pointer specifier 252 to find the next unicast SDU entry in the linked list to service 906. If, in attempting to service a next multicast FIFO entry 262, a multicast FIFO entry 262 is not found 902, then the multicast FIFO queue status is set (920) to "empty", and the sequencer 260, if the unicast linked list queue status is "not empty", inspects 904 the HOL pointer specifier 252 to service the next unicast SDU entry.

With an empty hybrid queue 112, if a multicast PDU forwarding request 248 is received 802 first, the above steps are repeated. A multicast FIFO queue entry 262 is created 818 and populated with the multicast SDU descriptor pointer. The inter-departure-counter 266 is set 820 to the value of the arrival counter 256, which is 0 (zero) and the multicast FIFO queue status is set 824 to "not empty". In servicing the hybrid queue 250, the sequencer 260 finds 902 the link list queue status "empty", the departure counter value equals (0 zero) the inter-departure-counter value 266 stored in the multicast FIFO queue entry 262 and services 926 the multicast FIFO queue entry 262. Subsequent to servicing 926 the FIFO queue entry 262, the sequencer 260 resets the multicast FIFO queue status to "empty" (920).

The HOL pointer specifier 252 holds an SDU descriptor pointer value always points to the next unicast SDU descriptor 222 to be serviced from the hybrid queue 250, regardless of the number of multicast SDUs pending servicing ahead of the unicast SDU descriptor pointed to.

A combined benefit is derived from unicast SDU descriptor linking to provide flexibility on the size of the hybrid queue 250, and efficiency in reserving storage resources by employing multicast FIFO queuing.

Returning to the exemplary 16 port switching node, if the exemplary 16 port switching node is implemented in accordance with the exemplary embodiment of the invention presented above, and assuming one hybrid queue 250 per output port, output queue reservations correspond only to the size of the multicast FIFO queue 254 portion of the hybrid queue 250. Therefore adjusting the storage reservations for each multicast FIFO queue 254 directly controls the bandwidth of multicast PDU traffic to be forwarded via the corresponding output port 110. The number of chained unicast SDU entries in the link list can potentially include all unicast PDUs stored in the central shared buffer 120 without requiring output port queuing reservations. Therefore the reservations for output port queuing may be reduced to 100 multicast FIFO queue entries per output port 110 and therefore only a total memory storage space for 2600 SDU descriptors needs to be provided. The presented solution provides the combined storage efficiency of unicast SDU queuing using link lists and easy access to multicast SDU queue entries.

The exemplary embodiment of the invention presented herein is well adapted for switch-on-a-chip device implementations.

The embodiments presented are exemplary only and persons skilled in the art would appreciate that variations to the above described embodiments may be made without departing from the spirit of the invention. The scope of the invention is solely defined by the appended claims.

I claim:

1. A hybrid queue for an output port of a protocol data unit (PDU) switching node comprising:
   a. a first input first output (FIFO) queue configured to store multicast FIFO entries, each multicast FIFO entry further comprising a multicast switching data unit (SDU) descriptor pointer and an inter-departure-counter specifier holding a number of unicast SDUs to be serviced ahead of the multicast SDU entry; each multicast SDU descriptor comprising a diversity field for specifying the number of output ports the multicast PDU is to be conveyed through;
   b. a linked list queue defined by a plurality of unicast SDU entries, each unicast SDU entry further comprising a unicast SDU descriptor, each unicast SDU descriptor further comprising a next SDU descriptor pointer;
   c. a unicast forwarding request arrival counter for counting unicast PDU forwarding requests received between multicast FIFO entries, the arrival counter being incremented with each unicast PDU forwarding request arrival, the arrival counter being decremented with each serviced unicast SDU entry if the multicast FIFO queue is empty, the value of the arrival counter being further copied to the inter-departure-counter of a subsequently received multicast FIFO entry upon receiving a multicast PDU forwarding request and the value of the arrival counter being reset to zero thereafter;
   d. a unicast PDU departure counter for counting unicast PDU departures between multicast PDU departures in servicing the unicast linked list queue if the multicast FIFO queue is not empty; and
   e. a sequencer for servicing unicast linked list entries and multicast FIFO queue entries, the sequencer servicing a next multicast FIFO entry if the value of the departure counter equates the value held in an inter-departure-count held in said next multicast FIFO entry and otherwise servicing the next unicast linked list entry pointed to by a head-of-line pointer specifier;

the combined unicast and multicast PDU forwarding request queuing benefiting from bandwidth efficient FIFO queuing of multicast forwarding requests, and memory storage efficient linked list queuing of unicast PDUs.

2. The hybrid queue of claim 1, wherein each SDU descriptor pointer is chained to a next SDU pointer field.

3. The hybrid queue of claim 1, further comprising a fan out diversity field configured to store data related to at least one output port.

4. The hybrid queue of claim 1, wherein memory space for the FIFO queue is reserved from a control shared buffer.

5. The hybrid queue of claim 1, wherein the sequencer is configured to select between unicast and multicast SDU FIFO entries.

6. The hybrid queue of claim 1, further comprising a head-of-line (HOL) pointer specifier, the HOL pointer specifier being maintained by the hybrid queue.

7. A system comprising:
   means for storing multicast first input first output (FIFO) entries, each multicast FIFO entry further comprising a multicast switching data unit (SDU) descriptor pointer and an inter-departure-counter specifier holding a number of unicast SDUs to be serviced ahead of the multicast SDU entry, each multicast SDU descriptor comprising a diversity field for specifying the number of output ports a multicast protocol data unit (PDU) is to be conveyed through;

means for queuing a linked list, the means for queuing defined by a plurality of unicast SDU entries, each unicast SDU entry further comprising a unicast SDU descriptor, each unicast SDU descriptor further comprising a next SDU descriptor pointer;

means for counting unicast PDU forwarding requests received between multicast FIFO entries, the means for counting unicast PDU forwarding requests being incremented with each unicast PDU forwarding request arrival, the means for counting unicast PDU forwarding requests being decremented with each serviced unicast SDU entry if the multicast FIFO queue is empty, the value of the means for counting unicast PDU forwarding requests being further copied to the inter-departure-counter of a subsequently received multicast FIFO entry upon receiving a multicast PDU forwarding request and the value of the means for counting unicast PDU forwarding requests being reset to zero thereafter;

means for counting unicast PDU departures between multicast PDU departures in servicing the unicast linked list queue if the multicast FIFO queue is not empty; and means for servicing unicast linked list entries and multicast FIFO queue entries, the sequencer servicing a next multicast FIFO entry if the value of the departure counter equates the value held in an inter-departure-count held in said next multicast FIFO entry and otherwise servicing the next unicast linked list entry pointed to by a head-of-line pointer specifier, the combined unicast and multicast PDU forwarding request queuing benefiting from bandwidth efficient FIFO queuing of multicast forwarding requests, and memory storage efficient linked list queuing of unicast PDUs.

8. The system of claim 7, further comprising means for chaining the descriptor pointer to a next SDU pointer field.

9. The system of claim 7, further comprising means for storing data related to at least one output port.

10. The system of claim 7, further comprising means for reserving memory space for the FIFO queue from a control shared buffer.

11. The system of claim 7, further comprising means for selecting between unicast and multicast SDU FIFO entries.

12. The system of claim 7, further comprising means for utilizing a head-of-line (HOL) pointer specifier, the HOL pointer specifier being maintained by the hybrid queue.

* * * * *